United States Patent
Ryu et al.

(10) Patent No.: US 7,715,313 B2
(45) Date of Patent: May 11, 2010

(54) METHOD OF AND APPARATUS FOR TRANSMITTING RESIDENTIAL ETHERNET STREAM

(75) Inventors: Hyun-surk Ryu, Suwon-si (KR); Fei fei Feng, Yongin-si (KR); Cornelis Johannis Den Hollander, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 11/486,278

(22) Filed: Jul. 14, 2006

(65) Prior Publication Data

US 2007/0014316 A1 Jan. 18, 2007

Related U.S. Application Data

(60) Provisional application No. 60/699,505, filed on Jul. 15, 2005.

(30) Foreign Application Priority Data

Jun. 22, 2006 (KR) .................. 10-2006-0056172

(51) Int. Cl.
*H04L 12/26* (2006.01)

(52) U.S. Cl. ..................... 370/230
(58) Field of Classification Search ......... 370/229–231, 370/235, 236, 464, 477, 478, 498, 537
See application file for complete search history.

(56) References Cited

U.S. PATENT DOCUMENTS

2007/0223470 A1* 9/2007 Stahl .................. 370/389

OTHER PUBLICATIONS

Residential Ethernet standard, Draft 0.091, Jun. 7, 2005, DVJ, pp. 1-138.*
Residential Ethernet standard, Draft 0.084, May 3, 2005, DVJ, pp. 1-116.*

* cited by examiner

*Primary Examiner*—Dmitry H Levitan
(74) *Attorney, Agent, or Firm*—Sughrue Mion, PLLC

(57) ABSTRACT

Residential Ethernet stream transmitting method and apparatus are provided. The residential Ethernet stream transmitting method includes transmitting a data frame comprising multi-cycle traffic information and receiving the data frame within an admission control condition based on the multi-cycle traffic information.

29 Claims, 6 Drawing Sheets

Multi-cycle traffic

METHOD OF AND APPARATUS FOR TRANSMITTING RESIDENTIAL ETHERNET STREAM

CROSS-REFERENCE TO RELATED APPLICATIONS

This application claims priority from U.S. Provisional Patent Application No. 60/699,505, filed on Jul. 15, 2005, in the United States Patent and Trademark Office and Korean Patent Application No. 10-2006-0056172, filed on Jun. 22, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to transmitting a residential Ethernet stream and, more particularly to a method of and an apparatus for transmitting a residential Ethernet stream, which transmits data frames of a mono-cycle traffic model having one bandwidth according to a multi-cycle traffic model having a plurality of bandwidths in a residential Ethernet network to improve a utilization of data frames.

2. Description of the Related Art

Current residential Ethernet networks connect various types of household appliances such as televisions (TVs), digital versatile discs (DVDs), etc. to one Ethernet network and control the operations of the respective nodes through controllers.

For example, the residential Ethernet networks can be included in the home network service and connected to illumination devices, audio devices, plasma display panel (PDP) TVs, DVD players, or the like through a home server controlling the home network service.

Such a residential Ethernet network is connected to an external network to cover a designated residential area, and includes a gateway in the residential area and network nodes connected to the gateway.

In addition, the residential Ethernet network transmits data frames in a predetermined cycle. The predetermined cycle may have the pacing of 125 micro-seconds (µs) as shown in FIG. 1. The residential Ethernet network provides synchronizations among the nodes and transmits data frames 110 of a predetermined size in the cycle of 125 µs using sync bits of a media access control (MAC) layer.

A residential Ethernet network transmitting data frames in a predetermined cycle as described above stores the data frames transmitted from a random node in a random cycle in a buffer register of a gateway, and transmits the data frames to a destination node in the next cycle.

Accordingly, the residential Ethernet network transmits the data frames in a mono-cycle traffic model having pacing of 125 µs as shown in FIG. 1. Thus, the transmitted data frames have a low bandwidth. As a result, a transmission overhead occurs, and thus bandwidths are wasted due to other unused bandwidths. Therefore, the utilization of bandwidths is deteriorated.

SUMMARY OF THE INVENTION

Accordingly, the present general inventive concept has been made to address the above-mentioned problems, and an aspect of the present general inventive concept is to provide a method of and an apparatus for transmitting residential Ethernet stream, which transmits data frames of a mono-cycle traffic model having one bandwidth according to a multi-cycle traffic model having a plurality of bandwidths in a residential Ethernet network to improve an utilization of the data frames.

According to an aspect of the present invention, there is provided a method of transmitting an Ethernet stream, including: transmitting a data frame comprising multi-cycle traffic information; and receiving the data frame within an admission control condition based on the multi-cycle traffic information.

The multi-cycle traffic information may include bandwidth information maximally required for transmitting or receiving the data frame in a residential Ethernet network.

The admission control condition may be obtained as in the equation below:

$$\sum_{n=1}^{N} B_n \leq r \times l,$$

wherein $B_n$ denotes a bandwidth in each cycle, r denotes a ratio of a whole link capacity allocable to an isochronous stream, and l denotes a link capacity.

The admission control condition may be obtained as in the equation below:

$$\sum_{n=1}^{N} C_n B_n \leq \left(P - \frac{k}{P_{base}}\right) \times l,$$

wherein N denotes a maximum number of traffic classes allowable in the residential Ethernet network, $C_n$ denotes a cycle ratio of traffic class n to a base cycle, l denotes a link capacity, P denotes a pacing parameter, $P_{base}$ denotes a pacing of a base cycle, and k denotes a transmission time for a largest asynchronous packet.

The pacing parameter may be a parameter paced to a cycle m+p so that the isochronous frame having reached a cycle m is forwarded.

The data frame may be transmitted simultaneously in first and second cycles respectively comprising first and second bandwidths.

If the first cycle has a base pacing $P_{base}$, the second cycle may have a pacing double the base pacing $P_{base}$ or a pacing larger than double the base pacing $P_{base}$.

If the first cycle has a base pacing $P_{base}$, the second cycle may have an odd-numbered pacing double the base pacing $P_{base}$ or larger than double the base pacing $P_{base}$.

If the first cycle has a base pacing $P_{base}$, the second cycle may have an even-numbered pacing double the base pacing $P_{base}$ or larger than double the base pacing $P_{base}$.

The data frame may be transmitted in a first cycle including a first bandwidth, a second cycle including a second bandwidth, and a third cycle including the second band width.

If the first cycle has a base pacing $P_{base}$, the second and third cycles may each have a pacing double the base pacing $P_{base}$ or larger than double the base pacing $P_{base}$. The second and third cycles may alternate with each other in a pacing double the base pacing $P_{base}$ or larger than double the base pacing $P_{base}$.

According to another aspect of the present invention, there is provided an apparatus for transmitting an Ethernet stream, including: a transmission node which transmits a data frame comprising multi-cycle traffic information; and a reception node which receives the data frame within an admission control condition based on the multi-cycle traffic information.

Functions of the transmission and reception nodes may be replaced with each other. The multi-cycle traffic information may include bandwidth information maximally required for transmitting or receiving the data frame in a residential Ethernet network.

The admission control condition may be obtained as in an equation below:

$$\sum_{n=1}^{N} B_n \leq r \times l,$$

wherein $B_n$ denotes a bandwidth in each cycle, r denotes a ratio of a whole link capacity allocable to an isochronous stream, and l denotes a link capacity.

The admission control condition may be obtained as in an equation below:

$$\sum_{n=1}^{N} C_n B_n \leq \left(P - \frac{k}{P_{base}}\right) \times l,$$

wherein N denotes a maximum number of traffic classes allowable in the residential Ethernet network, $C_n$ denotes a cycle ratio of traffic class n to a base cycle, l denotes a link capacity, P denotes a pacing parameter, $P_{base}$ denotes a pacing of a base cycle, and k denotes a transmission time for a largest asynchronous packet. The pacing parameter may be a parameter paced to a cycle m+p so that the isochronous frame having reached a cycle m is forwarded. Here, p is a design-dependent integer constant.

The transmission node may transmit the data frame simultaneously in first and second cycles respectively including first and second bandwidths.

If the first cycle has a base pacing $P_{base}$, the second cycle may have a pacing double the base pacing $P_{base}$ or a pacing larger than double the base pacing $P_{base}$. If the first cycle has a base pacing $P_{base}$, the second cycle may have an odd-numbered pacing double the base pacing $P_{base}$ or more than double the base pacing $P_{base}$. If the first cycle has a base pacing $P_{base}$, the second cycle may have an even-numbered pacing double the base pacing $P_{base}$ or larger than double the base pacing $P_{base}$.

The transmission node may transmit the data frame in a first cycle including a first bandwidth, a second cycle including a second bandwidth, and a third cycle including the second bandwidth.

If the first cycle has a base pacing $P_{base}$, the second and third cycles may each have a pacing double the base pacing $P_{base}$ or larger than double the base pacing $P_{base}$. The second and third cycles may alternate with each other in a pacing double the base pacing $P_{base}$ or more than double the base pacing $P_{base}$.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF EXEMPLARY EMBODIMENTS

Figure 1:
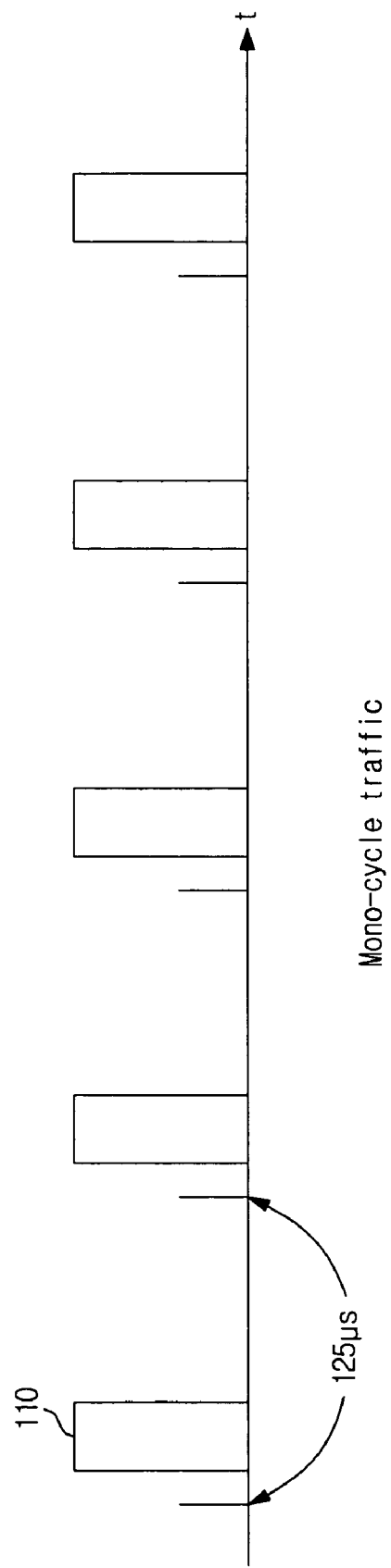
FIG. 1 is a view illustrating a transmission cycle of an Ethernet stream using a conventional mono-cycle traffic model.

Certain exemplary embodiments of the present invention will be described in greater detail with reference to the accompanying drawings.

In the following description, the same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since such description would obscure the invention in unnecessary detail.

Figure 2:
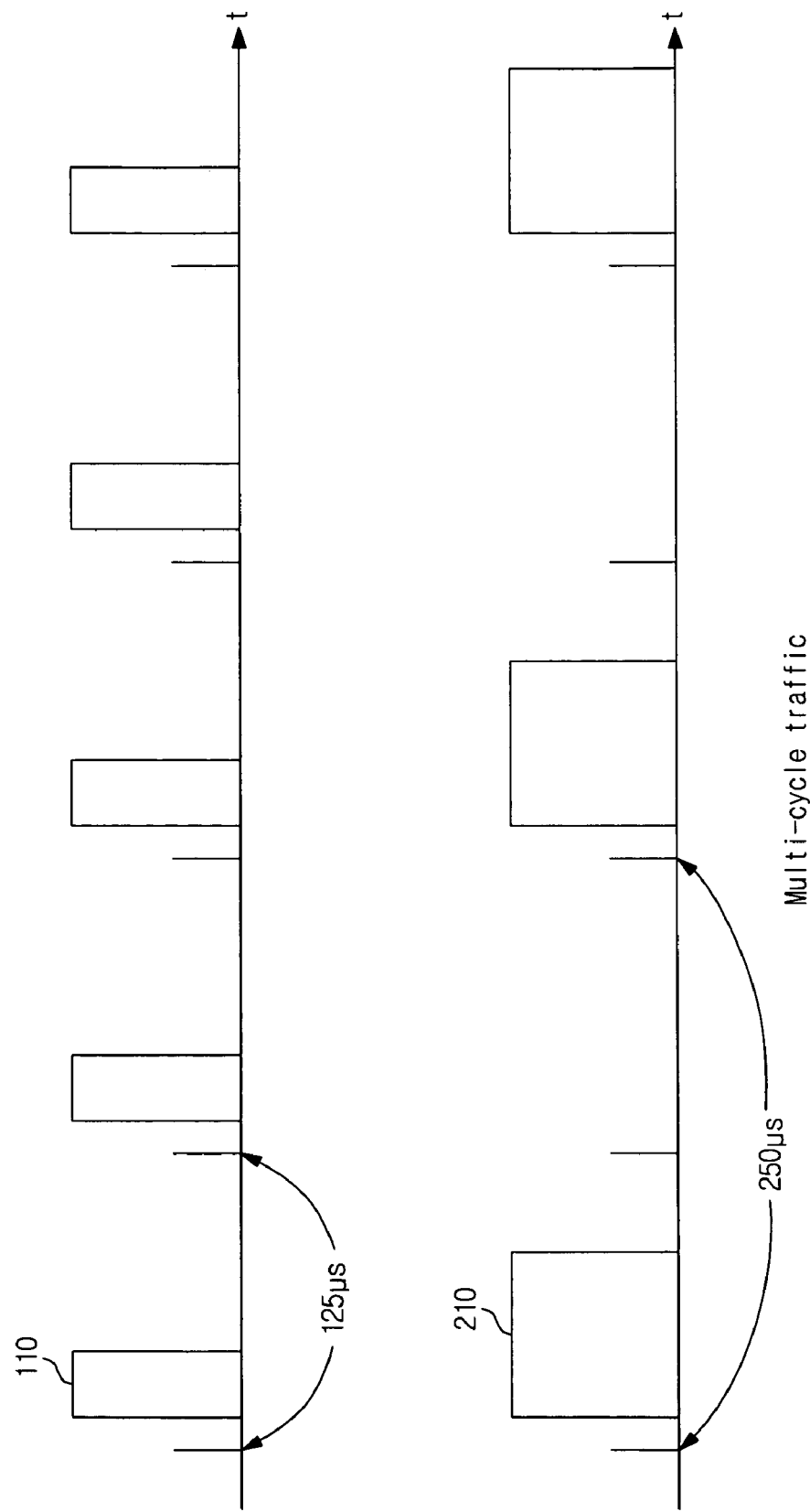
FIG. 2 is a view illustrating a transmission cycle of an Ethernet stream using a multi-cycle traffic model according to an exemplary embodiment of the present invention.

FIG. 2 is a view illustrating a transmission cycle of an Ethernet stream using a multi-cycle traffic model according to an exemplary embodiment of the present invention.

Figure 6:
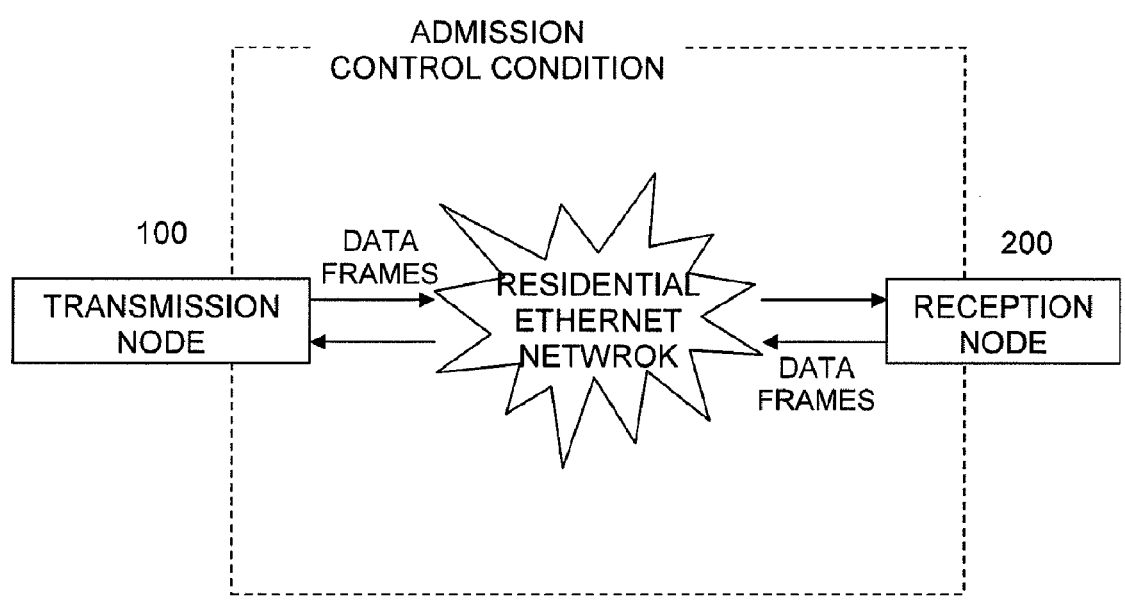
FIG. 6 illustrates a transmission node 100. and a reception node 200 that receives data frames including multi-cycle traffic information in a residential Ethernet network, according to an exemplary embodiment.

A residential Ethernet network according to an exemplary embodiment of the present invention includes a transmission node 100 transmitting data frames including multi-cycle traffic information, and a reception node 200 receiving the data frames within an admission control condition based on the multi-cycle traffic information as illustrated in FIG. 6.

The functions of the transmission and reception nodes may be exchanged with each other.

The multi-cycle traffic information includes bandwidth information required for transmitting or receiving the data frames in the residential Ethernet network. For example, according to the multi-cycle traffic information, a first data frame 110 may be transmitted in a first cycle to have a first bandwidth, while a second data frame 210 may be transmitted in a second cycle to have a second bandwidth as shown in FIG. 2. The first cycle may have a pacing of 125 μs, and the second cycle may have a pacing of 250 μs.

As shown in FIG. 2, the residential Ethernet network according to an exemplary embodiment of the present invention uses a multi-cycle traffic model in which the second data frame 210 having a wider bandwidth than that of the first data frame 110 used in a mono-cycle traffic model is transmitted along with the first data frame 110.

In the multi-cycle traffic model, the first data frame 110 having the first bandwidth may be transmitted according to the first cycle, and at the same time, the second data frame 210 having the second bandwidth may be transmitted according to the second cycle. For example, the first data frame 110 may be transmitted in the cycle of 125 μs, and the second data frame 210 may be transmitted in the cycle of 250 μs. The transmission cycle of the second data frame 210 may be 500 μs doubling 250 μs.

If the first cycle has a base pacing $P_{base}$ of 125 μs, the second cycle may have a pacing of 250 μs double the base pacing $P_{base}$ or a pacing larger than 250 μs Also, if the first cycle has the base pacing $P_{base}$ of 125 μs, the second cycle may have an odd-numbered pacing of 250 μs double the base pacing $P_{base}$ or an odd-numbered pacing larger than 250 μs.

Figure 3:
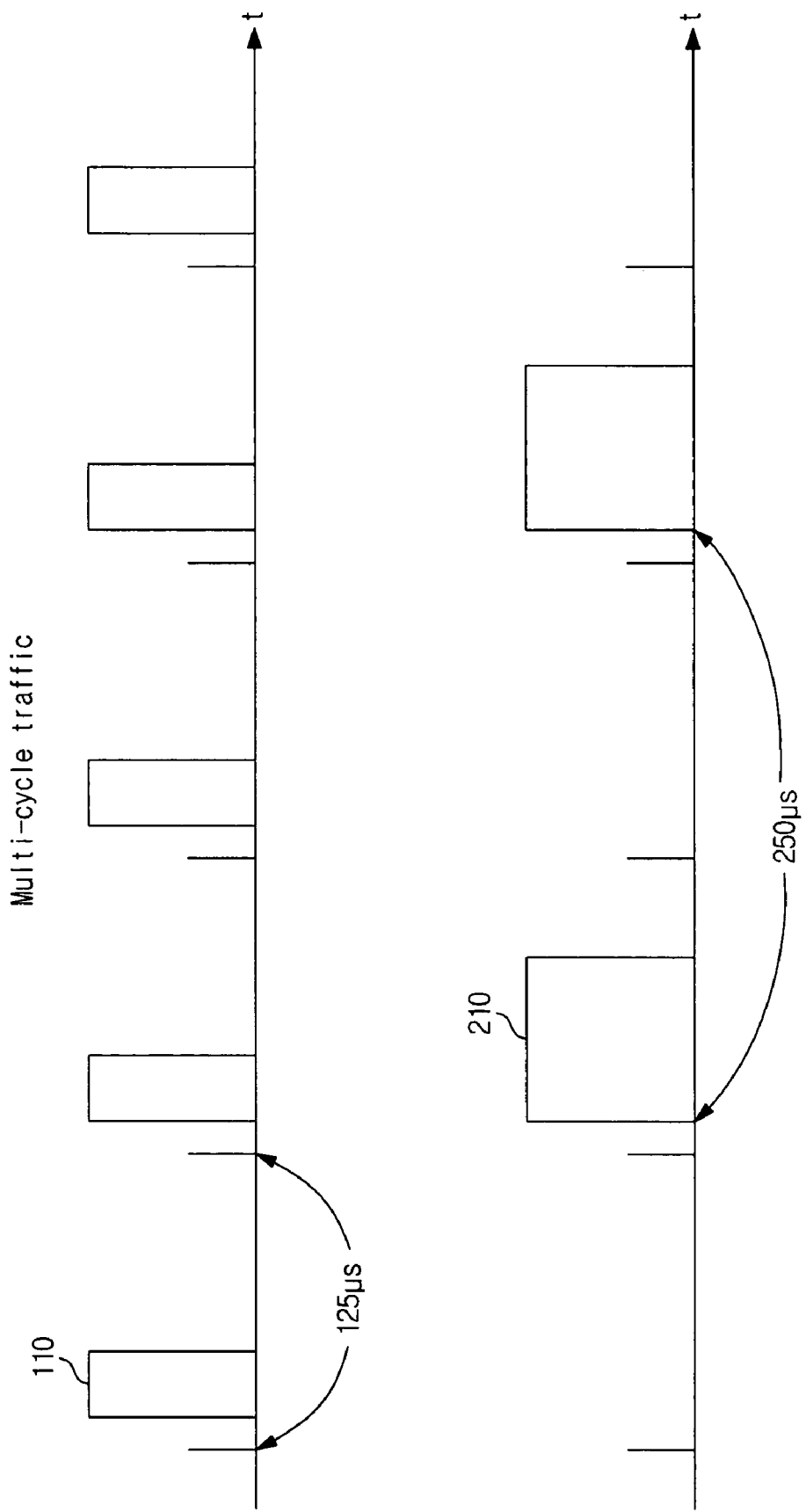
FIG. 3 is a view illustrating even-numbered cycles according to a multi-cycle traffic model.

In the multi-cycle traffic model, if the first cycle has the base pacing $P_{base}$ of 125 μs, the second cycle may have an even-numbered pacing of 250 μs double the base pacing $P_{base}$ or an even-numbered pacing larger than 250 μs as shown in FIG. 3.

Figure 4:
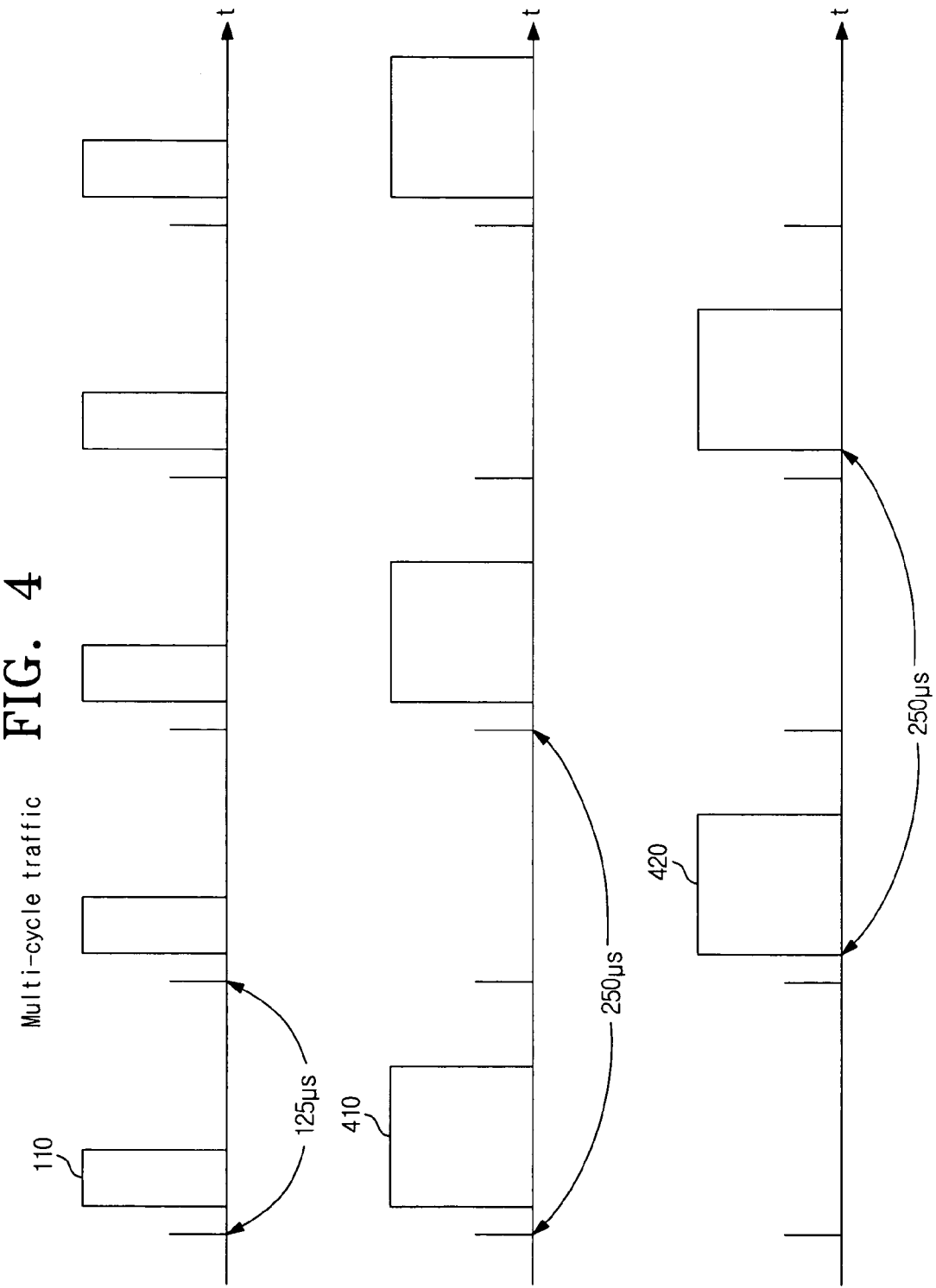
FIG. 4 is a view illustrating a multi-cycle traffic model having first through third cycles.

The transmission node may transmit a data frame in a first cycle having a first bandwidth, a second cycle having a second bandwidth, and a third cycle having the second bandwidth as shown in FIG. 4.

Here, if the first cycle has a base pacing $P_{base}$ of 125 μs, the second and third cycles may each have a pacing of 250 μs double the base pacing $P_{base}$ or a pacing larger than 250 μs. Also, the second and third cycles may alternate with each other with each having a pacing double the base pacing $P_{base}$ or a pacing larger than double the base pacing $P_{base}$ as shown in FIG. 4.

For example, referring to FIG. 4, a first data frame 110 has a first cycle having a base pacing of 125 μs and a first bandwidth, and a second data frame 410 has a second cycle having a pacing double the base pacing and a second bandwidth. Also, a third data frame 420 has an even-numbered third cycle having a pacing of 250 μs double the base pacing and a third bandwidth.

The admission control condition to which the reception node refers to receive the data frame based on the multi-cycle traffic information is expressed as in Equations 1 and 2:

$$\sum_{n=1}^{N} B_n \le r \times l, \quad (1)$$

where $B_n$ denotes a bandwidth allocated to each class, $\Sigma B_n$ denotes a maximum accumulated bandwidth allocated to each class, r denotes a ratio of a whole link capacity allocable to an isochronous stream, and l denotes a link capacity. Here, classes may denote cycles having different bandwidths.

In other words, in the admission control condition of the multi-cycle traffic model according to an exemplary embodiment of the present embodiment, a sum of bandwidths of classes (cycles) must be equal to or less than a product of the ratio of the whole link capacity allocable to isochronous streams and the link capacity.

$$\sum_{n=1}^{N} C_n B_n \le \left(P - \frac{k}{P_{base}}\right) \times l, \quad (2)$$

where N denotes a maximum number of traffic classes allowable in a network, $C_n$ denotes a cycle ratio of traffic class n to a base cycle, l denotes a link capacity, k denotes a transmission time for a largest asynchronous packet, for example, 123 μs in a case of a 100 Mbps Ethernet of or 12.3 μs in a case of 1 Gbps Ethernet, P denotes a pacing parameter paced to a cycle m+p so that an isochronous frame having reached a cycle m is forwarded, and $P_{base}$ denotes a pacing of a base cycle, for example 125 μs. Here, p is a design-dependent integer constant.

Figure 5:
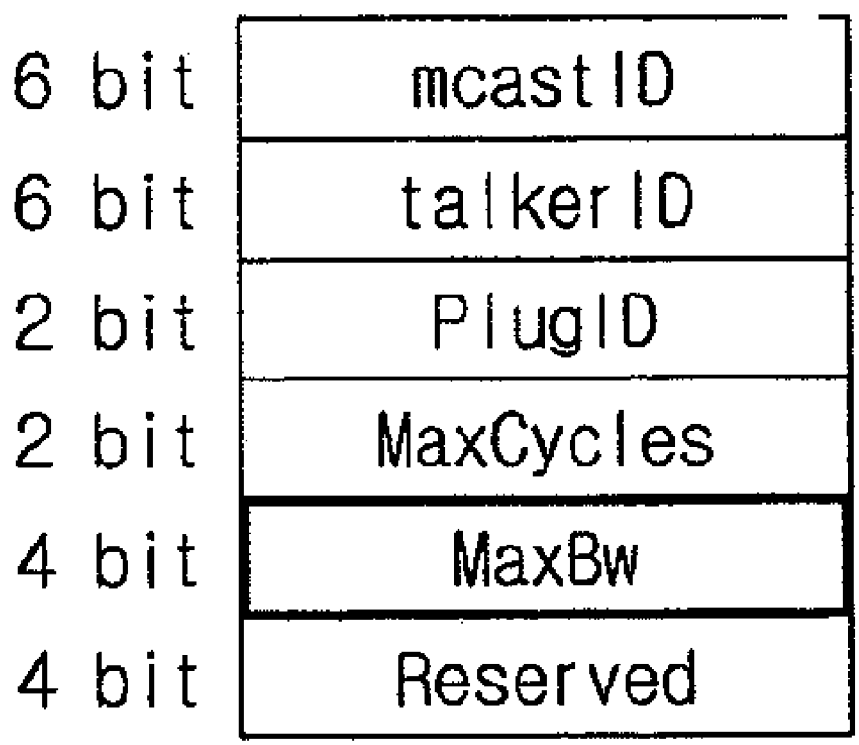
FIG. 5 is a view illustrating a structure of a data frame for performing subscription signaling according to a multi-cycle traffic model.

FIG. 5 is a view illustrating a structure of a data frame for performing subscription signaling according to a multi-cycle traffic model. Referring to FIG. 5, the data frame includes a multicast destination label mcast ID of 6 bits, a multicast talker identifier talkerID of 6 bits, a resource within the talker plugID of 2 bits, a delay from the talker maxCycles of 2 bits, a maximum required bandwidth maxBW of 4 bits, and reserved 4 bits.

Here, the subscription signaling is a procedure of setting a communication method of performing transmitting and receiving in a multi-cycle traffic model according to an exemplary embodiment of the present invention before the data frame is transmitted and received between the transmission and reception nodes. For this purpose, in an exemplary embodiment of the present invention, a maximum required bandwidth field maxBW and a reserved bit field are added to a structure of an existing data frame. Here, the maximum required bandwidth field maxBW includes bandwidth information to be transmitted in a multi-cycle traffic model and used in each cycle.

According to an exemplary embodiment of the present invention, the maximum required bandwidth field maxBW may be effectively used to utilize resources of a low bandwidth stream such as a compact disc (CD) audio stream in a home network area. Also, a residential Ethernet stream according to an exemplary embodiment of the present invention may be transmitted without changing an existing system structure If a transmission speed of a residential Ethernet network according to an exemplary embodiment of the present invention is 100 Mbps, a base cycle $P_{base}$ may be set to 125 μs. When the transmission node transmits a stream in the multi-cycle traffic model according an exemplary embodiment of to the present invention, one class of the stream may use a cycle of 125 μs, and another class may use a cycle of 250 μs. Here, each stream may be allocated at a link capacity of about 75%. A pacing parameter p is set to "2," and maximum bandwidths $B_{125}$ and $B_{250}$ may be respectively allocated to two streams.

Thus, an admission control condition of a transmission stream according to the multi-cycle traffic model of an exemplary embodiment of the present invention can be obtained as in Equation 3:

$$B_{125} + B_{250} = 75 \text{ Mbps}$$

$$B_{125} + 2 \times B_{250} \le 100 \text{ Mbps} \quad (3)$$

For example, in a case of a 2 Mbps CD audio, an inter packet gap (IPG) is 12 bytes, a preamble is 8 bytes, a destination added (DA) is 6 bytes, a source added (SA) is 6 bytes, a length and/or type is 2 bytes, a frame check sequence (FCS) is 4 bytes, and a pad depending on packet data unit (PDU) size is between 0 bytes and 46 bytes. Thus, 32/(32+38+14)=~38%. The 32 bytes is obtained as 2 Mbit/s multiplied by the 125 μs cycle (and rounded up).

However, if a cycle of 250 μs is used, a payload is 63 bytes per each cycle. Thus, 63/(63+38)=~62%. Also, if a cycle of 500 μs is used, a payload is 125 bytes. Thus, 125/(125+38)=~77%.

In other words, in the case of the 2 Mbps CD audio, if a cycle of 250 μs is used, a utilization of the cycle can be increased from 38% to 62% compared to an existing cycle of 125 μs.

As described above, according to exemplary embodiments of the present invention, a transmission stream can be transmitted in a multi-cycle traffic model in a residential Ethernet network. Also, waste of bandwidths can be reduced to reduce a transmission overhead and improve a utilization of the bandwidths.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of transmitting an Ethernet stream in a network, comprising:
    transmitting data frames comprising multi-cycle traffic information; and
    receiving the data frames,
    wherein the data frames are transmitted at different cycles, the different cycles being different data transmission frequencies,
    wherein the multi-cycle traffic information comprises information on a bandwidth used for the transmitting, and
    wherein the transmitting and the receiving are performed based on an admission control condition corresponding to the multi-cycle traffic information.

2. The method of claim 1, wherein the multi-cycle traffic information comprises information on a maximum bandwidth required for transmitting or receiving the data frames in the network,
    wherein the network is a residential Ethernet network.

3. The method of claim 1, wherein the admission control condition is defined by an equation:

$$\sum_{n=1}^{N} B_n \leq r \times l,$$

wherein $B_n$ denotes a bandwidth used for a data frame transmitted at each cycle of the different cycles, r denotes a ratio of a whole link capacity corresponding to a bandwidth allocable to data frames which are transmitted simultaneously to a link capacity of the network, and l denotes the link capacity.

4. The method of claim 1, wherein the admission control condition is defined by an equation:

$$\sum_{n=1}^{N} C_n B_n \leq \left(P - \frac{k}{P_{base}}\right) \times l,$$

wherein N denotes a maximum number of cycles allowable in the Ethernet network, $C_n$ denotes a cycle ratio of a cycle n to a base cycle among the different cycles, l denotes a link capacity of the network, P denotes a pacing parameter, $P_{base}$ denotes a pacing of a base cycle, and k denotes a transmission time for a largest asynchronous packet.

5. The method of claim 4, wherein the pacing parameter is a parameter paced to a cycle m+p so that the isochronous frame having reached a cycle m is forwarded, wherein p is a design-dependent integer constant.

6. The method of claim 1, wherein the data frames are transmitted such that first and second data frames are transmitted simultaneously in first and second cycles using first and second bandwidths, respectively.

7. The method of claim 6, wherein if a first cycle has a base pacing $P_{base}$, the second cycle has one of a pacing double the base pacing $P_{base}$ and a pacing larger than double the base pacing $P_{base}$.

8. The method of claim 6, wherein if the first cycle has a base pacing $P_{base}$, the second cycle has an odd-numbered pacing double the base pacing $P_{base}$ or larger than double the base pacing $P_{base}$.

9. The method of claim 6, wherein if the first cycle has a base pacing $P_{base}$, the second cycle has an even-numbered pacing double the base pacing $P_{base}$ or larger than double the base pacing $P_{base}$.

10. The method of claim 6, wherein the first and second data frames are a portion of one single media content comprising at least one of video and audio.

11. The method of claim 1, wherein the data frames are transmitted in at least one of a first cycle comprising a first bandwidth, a second cycle comprising a second bandwidth, and a third cycle comprising the second band width.

12. The method of claim 11, wherein if the first cycle has a base pacing $P_{base}$, the second and third cycles each have a pacing double the base pacing $P_{base}$ or larger than double the base pacing $P_{base}$.

13. The method of claim 12, wherein the second and third cycles alternate with each other in a pacing double the base pacing $P_{base}$ or larger than double the base pacing $P_{base}$.

14. The method of claim 1, wherein the data frames are a portion of one single media content comprising at least one of video and audio.

15. An apparatus for transmitting an Ethernet stream, wherein the apparatus is configured to transmit data frames comprising multi-cycle traffic information to a reception node in a network,
    wherein the data frames are transmitted at different cycles, the different cycles being different data transmission frequencies,
    wherein the multi-cycle traffic information comprises information on a bandwidth used for the transmission, and
    wherein the transmission by the apparatus and the reception by the reception node are performed based on an admission control condition corresponding to the multi-cycle traffic information.

16. The apparatus of claim 15, wherein the apparatus is further configured to receive other data frames comprising another multi-cycle traffic information from a transmission node in the network,
    wherein the other data frames are transmitted at other different cycles,
    wherein the other multi-cycle traffic information comprises information on another bandwidth used for the transmission of the other data frames, and
    wherein the transmission of the other data frames by the transmission node and the reception by the apparatus are performed based on another admission control condition corresponding to the other multi-cycle traffic information.

17. The apparatus of claim 15, wherein the multi-cycle traffic information comprises information on a maximum bandwidth required for transmitting or receiving the data frames in the network, wherein the network is a residential Ethernet network.

18. The apparatus of claim 15, wherein the admission control condition is defined by an equation:

$$\sum_{n=1}^{N} B_n \leq r \times l,$$

wherein $B_n$ denotes a bandwidth used for a data frame transmitted at each cycle of the different cycles, r denotes a ratio of a whole link capacity corresponding to a bandwidth allocable to data frames which are transmitted simultaneously to a link capacity of the network, and l denotes the link capacity.

19. The apparatus of claim 15, wherein the admission control condition is defined by an equation:

$$\sum_{n=1}^{N} C_n B_n \leq \left(P - \frac{k}{P_{base}}\right) \times l,$$

wherein N denotes a maximum number of cycles allowable in the Ethernet network, $C_n$ denotes a cycle ratio of a cycle n to a base cycle among the different cycles, l denotes a link capacity of the network, P denotes a pacing parameter, $P_{base}$ denotes a pacing of a base cycle, and k denotes a transmission time for a largest asynchronous packet.

20. The apparatus of claim 19, wherein the pacing parameter is a parameter paced to a cycle m+p so that the isochronous frame having reached a cycle m is forwarded, wherein p is a design-dependent integer constant.

21. The apparatus of claim 15, wherein the transmission node transmits the data frames such that first and second data frames are transmitted simultaneously in first and second cycles using first and second bandwidths, respectively.

22. The apparatus of claim 21, wherein if the first cycle has a base pacing $P_{base}$, the second cycle has one of a pacing double the base pacing $P_{base}$ and a pacing larger than double the base pacing $P_{base}$.

23. The apparatus of claim 21, wherein if the first cycle has a base pacing $P_{base}$, the second cycle has an odd-numbered pacing double the base pacing $P_{base}$ or more than double the base pacing $P_{base}$.

24. The apparatus of claim 21, wherein if the first cycle has a base pacing $P_{base}$, the second cycle has an even-numbered pacing double the base pacing $P_{base}$ or larger than double the base pacing $P_{base}$.

25. The apparatus of claim 21, the first and second data frames are a portion of one single media content comprising at least one of video and audio.

26. The apparatus of claim 15, wherein the transmission node transmits the data frames in at least one of a first cycle comprising a first bandwidth, a second cycle comprising a second bandwidth, and a third cycle comprising the second bandwidth.

27. The apparatus of claim 26, wherein if the first cycle has a base pacing $P_{base}$, the second and third cycles each have a pacing double the base pacing $P_{base}$ or larger than double the base pacing $P_{base}$.

28. The apparatus of claim 27, wherein the second and third cycles alternate with each other in a pacing double the base pacing $P_{base}$ or more than double the base pacing $P_{base}$.

29. The apparatus of claim 15, wherein the data frames are a portion of one single media content comprising at least one of video and audio.

* * * * *